(12) United States Patent
Schluetter

(10) Patent No.: US 8,108,297 B2
(45) Date of Patent: *Jan. 31, 2012

(54) METHOD AND APPARATUS FOR A FAIR EXCHANGE

(75) Inventor: Jens-Uwe Schluetter, Evanston, IL (US)

(73) Assignee: Trading Technologies International, Inc., Chicago, IL (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/782,485

(22) Filed: May 18, 2010

(65) Prior Publication Data

US 2010/0228644 A1 Sep. 9, 2010

Related U.S. Application Data

(63) Continuation of application No. 10/263,102, filed on Oct. 2, 2002, now Pat. No. 7,752,115.

(51) Int. Cl.
*G06Q 40/00* (2006.01)
(52) U.S. Cl. .......................................... 705/37; 705/35
(58) Field of Classification Search ............... 705/37
See application file for complete search history.

(56) References Cited

U.S. PATENT DOCUMENTS

| | | | |
|---|---|---|---|
| 4,674,044 A | 6/1987 | Kalmus et al. | |
| 4,750,135 A | 6/1988 | Boilen | |
| 4,903,201 A | 2/1990 | Wagner | |
| 5,038,284 A | 8/1991 | Kramer | |
| 5,077,665 A | 12/1991 | Silverman et al. | |
| 5,101,353 A | 3/1992 | Lupien et al. | |
| 5,136,501 A | 8/1992 | Silverman et al. | |
| 5,270,922 A | 12/1993 | Higgins | |
| 5,297,031 A | 3/1994 | Gutterman et al. | |
| 5,297,032 A | 3/1994 | Trojan et al. | |
| 5,455,965 A | 10/1995 | Shaughnessy et al. | |
| 5,689,651 A | 11/1997 | Lozman | |
| 5,695,400 A | 12/1997 | Fennell, Jr. et al. | |
| 5,717,725 A * | 2/1998 | Campana, Jr. | 375/347 |
| 5,727,165 A | 3/1998 | Ordish et al. | |
| 5,774,877 A | 6/1998 | Patterson, Jr. et al. | |
| 5,775,996 A | 7/1998 | Othmer et al. | |

(Continued)

FOREIGN PATENT DOCUMENTS

EP 0388162 9/1990

(Continued)

OTHER PUBLICATIONS

Awduche et al., "Synchronized Broadcast in Cellular Networks", Second Telecommunications R&D Conference, pp. 1-12 (1996).

(Continued)

*Primary Examiner* — Sarah Monfeldt
(74) *Attorney, Agent, or Firm* — McDonnell Boehnen Hulbert & Berghoff LLP

(57) ABSTRACT

A fair exchange is disclosed to reduce potential inequities in an electronic trading environment. Market data is sent from a host system to client devices through one or more synchronized local communication servers such that the data can be displayed simultaneously or nearly simultaneously at each client device. Market data sent to client devices might include price information. Likewise, a host system may transaction data sent from client devices via the local communication servers. The ordering of transaction data is based, at least in part, on when the local communication servers received the transaction data from the client devices. Transaction data sent to a host system might include order information.

39 Claims, 9 Drawing Sheets

U.S. PATENT DOCUMENTS

| | | | |
|---|---|---|---|
| 5,793,301 A | 8/1998 | Patterson, Jr. et al. | |
| 5,797,002 A | 8/1998 | Patterson, Jr. et al. | |
| 5,820,463 A | 10/1998 | O'Callaghan | |
| 5,845,266 A | 12/1998 | Lupien et al. | |
| 5,915,245 A | 6/1999 | Patterson, Jr. et al. | |
| 5,924,082 A | 7/1999 | Silverman et al. | |
| 5,924,083 A | 7/1999 | Silverman et al. | |
| 5,946,667 A | 8/1999 | Tull, Jr. et al. | |
| 5,953,708 A | 9/1999 | Midorikawa et al. | |
| 5,963,923 A | 10/1999 | Garber | |
| 6,012,046 A | 1/2000 | Lupien et al. | |
| 6,014,643 A | 1/2000 | Minton | |
| 6,035,287 A | 3/2000 | Stallaert et al. | |
| 6,098,051 A | 8/2000 | Lupien et al. | |
| 6,131,087 A | 10/2000 | Luke et al. | |
| 6,134,535 A | 10/2000 | Belzberg | |
| 6,195,647 B1 | 2/2001 | Martyn et al. | |
| 6,247,000 B1 | 6/2001 | Hawkins et al. | |
| 6,272,474 B1 | 8/2001 | Garcia | |
| 6,278,982 B1 | 8/2001 | Korhammer et al. | |
| 6,282,521 B1 | 8/2001 | Howorka | |
| 6,377,940 B2 | 4/2002 | Tilfors et al. | |
| 6,405,180 B2 | 6/2002 | Tilfors et al. | |
| 6,408,282 B1 | 6/2002 | Buist | |
| 6,411,998 B1 | 6/2002 | Bryant et al. | |
| 6,512,761 B1 | 1/2003 | Schuster et al. | |
| 6,659,861 B1 | 12/2003 | Faris et al. | |
| 6,772,132 B1 | 8/2004 | Kemp, II et al. | |
| 7,461,026 B2 | 12/2008 | Schluetter | |
| 7,492,720 B2 * | 2/2009 | Pruthi et al. | 370/252 |
| 7,577,167 B2 * | 8/2009 | Kikuchi et al. | 370/508 |
| 2002/0023038 A1 | 2/2002 | Fritsch et al. | |
| 2002/0026321 A1 | 2/2002 | Faris et al. | |
| 2002/0027957 A1 * | 3/2002 | Paulraj et al. | 375/267 |
| 2002/0035534 A1 | 3/2002 | Buist et al. | |
| 2002/0055899 A1 | 5/2002 | Williams | |
| 2002/0073016 A1 | 6/2002 | Furbush et al. | |
| 2002/0077117 A1 | 6/2002 | Cloutier et al. | |
| 2002/0107748 A1 | 8/2002 | Boies et al. | |
| 2002/0120837 A1 * | 8/2002 | Maxemchuk et al. | 713/153 |
| 2002/0138401 A1 | 9/2002 | Allen et al. | |
| 2002/0161687 A1 | 10/2002 | Serkin et al. | |
| 2002/0161693 A1 | 10/2002 | Greenwald | |
| 2002/0178102 A1 | 11/2002 | Scheinberg et al. | |
| 2003/0074413 A1 | 4/2003 | Nielsen et al. | |
| 2003/0177154 A1 * | 9/2003 | Vrancic | 708/160 |
| 2003/0229574 A1 | 12/2003 | Friedman et al. | |
| 2005/0073961 A1 * | 4/2005 | Paik et al. | 370/252 |

FOREIGN PATENT DOCUMENTS

| | | |
|---|---|---|
| EP | 1067471 | 1/2001 |
| GB | 2366630 A | 3/2002 |
| WO | 90/10910 | 9/1990 |
| WO | 90/11571 | 10/1990 |
| WO | 91/14231 | 9/1991 |
| WO | 95/26005 | 9/1995 |
| WO | 98/49639 | 11/1998 |
| WO | 99/19821 | 4/1999 |
| WO | 99/30259 | 6/1999 |
| WO | 99/53424 | 10/1999 |
| WO | 00/11587 | 3/2000 |
| WO | 00/50974 | 8/2000 |
| WO | 00/52619 | 9/2000 |
| WO | 00/62187 | 10/2000 |
| WO | 00/65510 | 11/2000 |
| WO | 01/16830 | 3/2001 |
| WO | 01/16852 | 3/2001 |
| WO | 01/22263 | 3/2001 |
| WO | 01/22315 | 3/2001 |
| WO | 01/88808 | 11/2001 |
| WO | 02/07032 | 1/2002 |
| WO | 02/15461 | 2/2002 |

OTHER PUBLICATIONS

Business Editors/High-Tech Writers. "Digistamp signs strategic partnership with European trust center EuroSignCard to safeguard monetary transactions in financial sector". Business Wire. New York: Mar. 14, 2001. (2 pages from ProQuest).

Escobar et al., "Flow Synchronization Protocol", Proceedings of the Global Telecommunications Conference, IEEE, pp. 1381-1387 (1992).

International Search Report for PCT/US03/31132.

Kharouf, A Trading Room with a View, Futures, 27, Nov. 11, 1998.

Supplementary European Search Report for EP 03 79 9387.

www.tradingtechnologies.com/products/xtrade_full.html (viewed May 22, 2001).

USPTO Presentation, NASDAQ, Nov. 8, 2001.

European Search Report for EP Application No. 10183556, dated Mar. 11, 2011.

European Search Report for EP Application No. 10183883, dated Mar. 11, 2011.

Pulido, Jose-Miguel, et al., "SM: Real-Time Multicast Protocols for Simultaneous Message Delivery," Real-Time Computing Systems and Applications, 1998. Proceedings. Fifth International Conference on Hiroshima, Japan Oct. 27-29, 1998, Los Alamitos, CA, USA,IEEE Comput. Soc, US, Oct. 27, 1998, pp. 66-73.

* cited by examiner

METHOD AND APPARATUS FOR A FAIR EXCHANGE

CROSS REFERENCE TO RELATED APPLICATIONS

The present application is a continuation of U.S. patent application Ser. No. 10/263,102 filed Oct. 2, 2002, now U.S. Pat. No. 7,752,115, the entire contents of which is incorporated herein by reference.

BACKGROUND OF THE INVENTION

The present invention relates to electronic exchanges and, more particularly, to reducing potential inequities when trading using an electronic exchange.

Many exchanges throughout the world implement electronic trading in varying degrees to trade one or more tradeable objects, where a tradeable object refers simply to anything that can be traded. Tradeable objects may include, but are not limited to, all types of traded financial products, such as, for example, stocks, options, bonds, futures, currency, and warrants, as well as funds, derivatives and collections of the foregoing, and all types of commodities, such as grains, energy and metals. A tradeable object may be "real," such as products that are listed by an exchange for trading, or "synthetic," such as a combination of real products that is created by the trader. Electronic trading has made it easier for a larger number of people with many different trading strategies to participate in the market at any given time. The increase in the number of potential traders has led to, among other things, a more competitive market, greater liquidity, and rapidly changing prices. Speed and assimilation of information is of great importance, otherwise the risk of loss can be substantially increased.

Exchanges that implement electronic trading are generally based on centralized computers (host), one or more networks, and the exchange participants' computers (client). In general, the host forms the electronic heart of the fully computerized electronic trading system. The host's operations typically cover order-matching, maintaining order books and positions, price information, and managing and updating the database for the online trading day as well as nightly batch runs. The host typically is also equipped with external interfaces that maintain uninterrupted online contact to quote vendors and other price information systems.

Typically, traders can link to the host through one or more networks, where a network can include a direct data line between the host and the client, or where a network can also include other common network components such as high-speed servers, routers, gateways, and so on. For example, a high-speed data line can be used to establish direct connections between the client and the host. In another example, the Internet can be used to establish a connection between the client and the host. There are many different types of networks, and combinations of network types, known in the art that can link traders to the host.

Regardless of the way in which a connection is established, the exchange participants' computers allow traders to participate in the market. They use software that creates specialized interactive trading screens on the traders' desktops. The trading screens enable traders to enter and execute orders, obtain market quotes, and monitor positions. The range and quality of features available to traders on their screens varies according to the specific software application being run.

Each market typically supplies the same information to and requires the same information from every trader. The bid and ask quantities and prices make up the primary market data and everyone logged on to trade can receive this information if the exchange provides it. Similarly, every exchange typically requires that certain information be included in each order. For example, traders typically supply information like the name of the commodity, quantity, restrictions, price and multiple other variables. Without all of this information, the exchange may not accept the order. In general, this input and output of information is the same for every trader.

In general, many market participants follow the same rules for decision-making. Given the same inputs (e.g., prices, market conditions, external indicators), a significant population will often come to the same decision regarding whether to buy or sell a certain tradeable object at a certain price. Inside market prices and the exchange order book information are often factors considered in a decision to send an order to the market.

Electronic exchanges typically award order priority based upon a first-in-first-out (FIFO) basis. At these exchanges, orders that are received earlier get a higher priority regardless of when the orders were actually sent. This means that there is a race, and at least a perceived advantage, to be the first in line. The same is true for deleting resting orders, as well such as unmatched limit orders in the exchange order book. Thus, poor network performance can cause a double disadvantage for any market participant. First, a trader or an automated trading system (ATS) will receive market information from the exchange later and, second, orders sent from the trader or ATS to the exchange will have a longer delay.

Having a faster connection to the exchange is therefore of foremost urgency for a large population of traders. However, if one group of traders has faster access to market data and the ability to send transactions faster than another group, this will tend to create an unfair environment, where one or a few participants will turn huge profits while others' ability to compete will be hampered. Similarly, an unfair environment would be created if certain groups of traders were given preferred access to an exchange. For exchanges, this could lead to a situation where many liquidity providers that cannot get preferred access will not compete.

One solution to this problem is to create a unified access policy and system architecture. For example, everyone may receive the same connection to the exchange (e.g., access speed and number of routers/hops/access servers). This concept may work for localized access where all participants are in the same geographic area using private networks (data lines) with stable and predictable transmission speed and latency. However, as soon as an exchange wishes to bring its market to participants outside of a controlled environment, access will no longer be the same for every participant. Communication times between continents may differ appreciably and using other (cheaper) distribution channels like the Internet and highly shared communication channels (such as Frame Relay with Burst) will cause unpredictable (typically higher) latency and lower access speed for a number of market participants. Traders that have a disadvantage will likely not take as much risk and also not participate actively in the market. To make a market really successful, every participant should have equivalent access speed and latency. This furthers competition and will lead to a fair and well-balanced market.

Another solution is to place synchronized clocks at each of the client devices, as disclosed in published U.S. Patent Application No. US 2002/0026321 A1, published on Feb. 28, 2002. For data sent from the host device to the client devices, the data is sent with a predetermined time (chosen by the operator) to display the data. The synchronized clocks at each of the client devices allow the simultaneous display of data at the predetermined time. Similarly, data sent from the client devices to the host device is time-stamped by the synchronized clocks at the client devices prior to being sent. Using the solution proposed in published U.S. Patent Application No. US 2002/0026321 A1 reduces some of the inequities when receiving or transmitting data; however, there are several problems with this solution. First, installing synchronized clocks at each of the client devices is costly to implement. Second, since the synchronized clocks are at the client devices, this creates security issues. The clocks may be tampered with since the client devices are uncontrolled. This is especially an issue in the context of trading. Trading typically occurs in a worldwide environment where there are a number of people trading in all sorts of uncontrolled locations. Third, this solution, while possibly suited to the periodic nature of games or contests, is not feasible for the near constant requirements of trading where thousands of transactions are consummated every day.

The advantages and features of the invention will become apparent to one of skilled in the art from the following detailed description, drawings, and appended claims.

DETAILED DESCRIPTION OF THE PRESENTLY PREFERRED EMBODIMENT(S)

Trading in an electronic exchange necessitates fairness for all who participate. Any inequity (or even a perceived inequity) will reduce one's incentive to participate. Leveling the playing field for all should result in greater participation in the competition. The trading context has several inequities that are, in effect, a barrier to entry for some who might otherwise participate. As discussed in the background section, decision-making in trading is largely based on current market conditions. An exchange system would normally aggregate a central order book and send out a broadcast to all end nodes with the current aggregated best prices as well as, in some instances, order book information (market depth). The exchange also sends out trade information and updated order book information when matches occur. Since all this data is particularly important when making trade decisions, any speed advantage/disadvantage would give a significant advantage/disadvantage to a single participant or group of participants. Reducing or eliminating these inequities will thereby promote participation and competition.

The preferred embodiments, referred to herein as the "fair exchange," are provided to reduce potential inequities in electronic trading in a practical manner. The following description is presented to enable a person of ordinary skill in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein. The fair exchange can be used with any electronic exchange or matching system for the trading of any type of tradeable object. While the examples set forth herein relate to an electronic exchange, the present invention may be applied to other time-sensitive transmissions in a network. Examples of those time-sensitive applications include, but are not limited to: (1) news or other financial information being disseminated to traders; (2) auctions of property (such as airline tickets, concert tickets, or any other type of property) involving competitive price bidding among numerous bidders; and (3) game competitions among multiple competitors.

Figure 1:
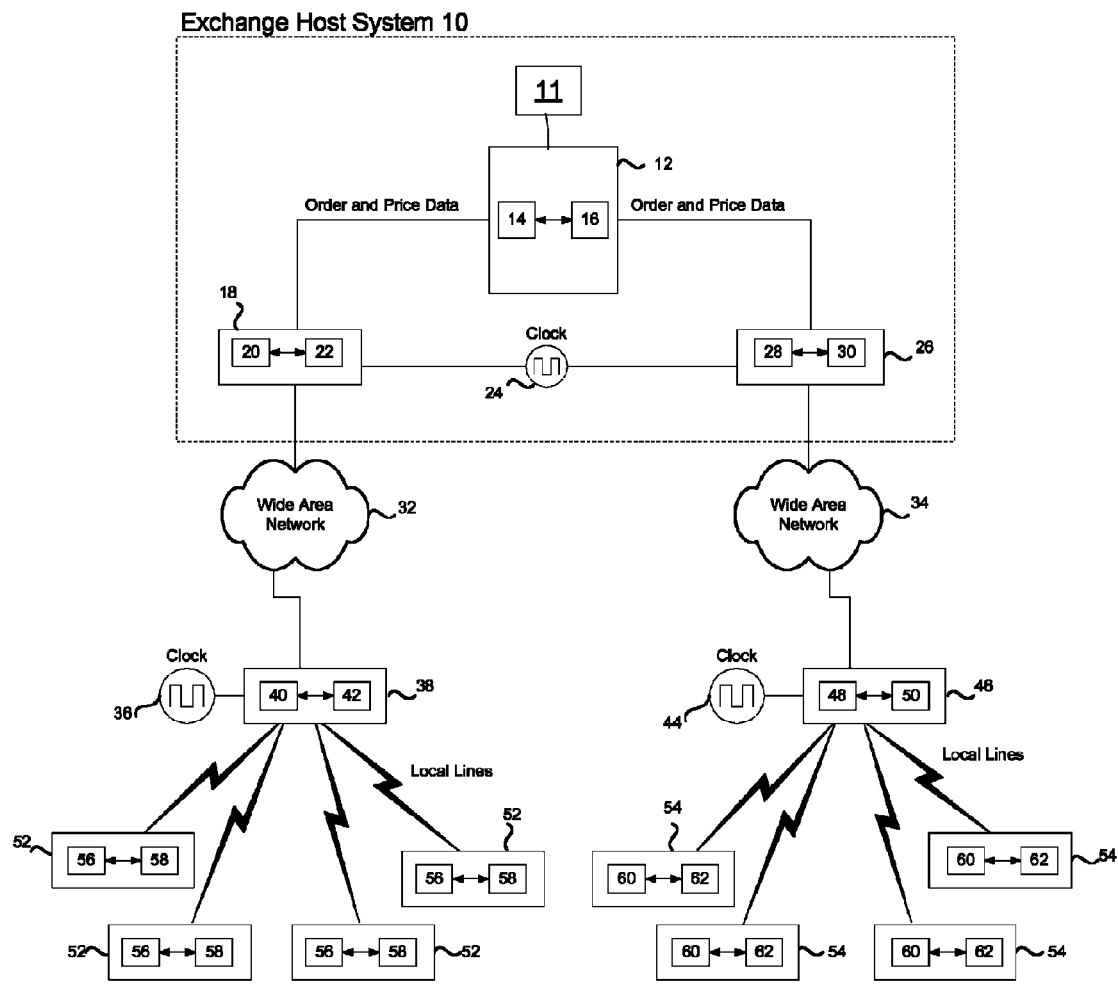
FIG. 1 is a schematic representation of an example electronic exchange network system of a preferred embodiment.

Referring to FIG. 1, there is shown a block diagram of one example network configuration of a preferred embodiment of the fair exchange. The exchange host system 10 includes a matching engine 11, a central order book 12, central communication servers 18, 26 and a clock 24. The central order book 12 may be implemented using known techniques on a processor 14 and a memory device 16. The processor 14 may comprise a microprocessor, a microcontroller, or any device that performs arithmetic, logic or control operations. The memory device 16 may include non-volatile memory devices such as a ROM and/or volatile memory devices such as a RAM. The matching engine 11 may also be implemented using known techniques on a separate server or processor and memory device (not shown). Alternatively, the matching engine 11 may be integrated with the central order book 12. In an alternate embodiment, rather than having a central matching engine 11, the matching engine may be distributed among different local and/or remote devices.

The central order book 12 is connected to one or more central communication servers. In the example of FIG. 1, two central communication servers, 18 and 26 are illustrated. The central communication servers 18, 26 may include a processor 20, 28 and a memory device 22, 30. The processors 20, 28 may be a microprocessor, a microcontroller, or any device which performs arithmetic, logic or control operations and the memory devices 22, 30 may be a volatile or non-volatile memory. As shown in FIG. 1, the central communication servers 18, 26 are communication servers located in the exchange host system 10, for example using a LAN connection, which would handle connections from, for example, multiple locally deployed communication servers, such as by local communication servers 38, 46.

In FIG. 1, the host system 10 includes a clock 24. The clock 24 may send its clock signal to the central communication servers 18, 26. In the alternative embodiment, the signal from the clock 24 may be supplied to the exchange host central order book 12 as well.

The central communication servers 18, 26 may be connected to networks 32, 34. A network is a group of two or more computers linked together. There are many types of networks such as local area networks and wide area networks. Networks can also be characterized by topology, protocol, and architecture. Networks are often comprised of a variety of direct connections and network components such as high-speed servers, routers, gateways, and so on. An example of a network is the Internet. However, any type of network configuration can be used with the preferred embodiment described herein.

As shown in FIG. 1, the local communication servers 38, 46 may be connected to the host system 10 by the networks 32, 34. While the preferred embodiment is described herein with reference to local communication servers 38, 46 in communication with central communication servers 18, 26 via networks 32, 34, these connections may be established in any manner, including by a direct connection such as a T1 or ISDN line. It is not necessary that the networks 32 and 34 be distinct. Rather, they may be the same network or overlap to any degree.

Local communication servers 38, 46 are preferably local points of reference whose location is chosen to be geographically close to a concentration of client devices, such as in the same city or country. For a European exchange for example, a local communication server 38 may be located in and serve traders in a major metropolitan area, such as New York or Chicago, and a local communication server 46 may be located in and serve traders in London. The local communication servers 38, 46 are preferably controlled by the exchange or some other reliable entity. The preferred embodiments, however, are not limited by what entity controls the local communication servers 38, 46. The local communication servers 38, 46 may include a processor 40, 48 and memory device 42, 50. The processors 40, 48 may be a microprocessor, a microcontroller, or any device which performs arithmetic, logic or control operations and the memory devices 42, 50 may be a volatile or non-volatile memory. As shown in FIG. 1, the local communication servers 38, 46 are coupled to clocks 36, 44. The clocks 24, 36 and 44 are utilized by the servers in one embodiment, to control the timing of the sending of information. Aside from controlling the timing of the sending of information, the servers 18, 26, 38, 46 are used for data distribution to and from the end nodes.

Client devices 52, 54, which are used by participants in the electronic exchange, are connected to the local communication servers 38, 46. These connections can be achieved in many different ways that are well known by those of ordinary skill in the art. For example, the connections can be direct or over a network as described above. In one embodiment, the client devices 52, 54 include a processor 56, 60 and at least one memory device 58, 62. The processors 56, 60 may be a microprocessor, a microcontroller, or any device which performs arithmetic, logic or control operations and the memory devices 58, 62 may be a volatile or non-volatile memory. The client devices 52, 54 are not limited to any particular hardware and/or software, but rather maybe any device that is capable of communicating with host system 10. For example, the client devices 52, 54 may be personal computers, workstations, personal digital assistants ("PDAs") smart phones, or any other wired or wireless communication devices.

The clocks 24, 36, 44 can be any synchronized clock. Various methods of implementing a reliable synchronized clock are known to those of ordinary skill in the art. In one preferred embodiment, the clocks are high precision reference clocks that synchronize with an atomic clock (such as one maintained by the National Institute of Standards and Technology in Colorado) via radio waves. In another preferred embodiment, the clocks are synchronized to a reference clock via the Network Time Protocol (NTP). As known to those of ordinary skill in art, the NTP is a widely used protocol in the Internet and in other networks to synchronize computer clocks to a national (or international) reference time. In another embodiment, the clock may incorporate a global positioning system (GPS) receiver to provide synchronization with a reference clock. The invention is not limited to any particular way of synchronizing the clocks or to the frequency at which the clocks are synchronized. The clocks may be accessible by any device within the system, such as the host system, devices within the network or the client devices. In one aspect, a clock is incorporated within a device within the system. Alternatively, a clock may be a standalone unit which may be accessible by a device within the system. Although the embodiments discussed herein reference separate clocks located at each local communication server and at the host, it is possible for some or all of these devices to remotely reference a time source and not use a local clock.

FIG. 1 illustrates merely one example architecture for the fair exchange. FIG. 1 does not necessarily disclose all of the components that could be used in this type of system. For example, this type of electronic trading system may include gateways that convert exchange specific protocols to client device specific protocols. In a preferred embodiment, clients 52, 54 connect to the local communication servers 38, 46 via gateways. Alternatively, the local communication servers 38, 46 could include gateways. For example, FIG. 1 illustrates two central communication servers 18, 26. Fewer or more communication servers may be used. In addition, FIG. 1 illustrates two networks 32, 34. A single network, such as a wide area network, may be used. Alternatively, multiple networks, including different types of networks (e.g., LAN, WAN, etc.), may be used. Moreover, FIG. 1 illustrates two local communication servers 38, 46; however, fewer or more communication servers may be used.

An electronic exchange typically supplies to, and requires the same information from, every trader. For example, exchange host central order book 12 may send market data information to the client devices 52, 54 regarding the bid and ask quantities and/or prices in the market. Trading applications running on the client devices 52, 54 may receive, process and display the market data information. Similarly, traders may send, via the client devices 52, 54, orders to the exchange host system 10. Every exchange typically requires that certain information be included in each order. For example, traders must generally send to the exchange information like their identification, the name of the tradeable object, quantity, restrictions, price and other information. Once the market receives the transaction, the matching engine 11 attempts to match buy orders with sell orders.

Order status and market information data, which may be in the form of packets, may be sent from host system 10 to client devices 52, 54 via central communication servers 18, 26, networks 32, 34 and local communication servers 38, 46. Likewise, data may be sent from the client devices 52, 54 to the host system 10 via the local communication servers 38, 46, the networks 32, 34 and the central communication servers 18, 26.

Examples of information that may be sent to the client devices 52, 54 from the host system 10 include inside market information and market depth information. Inside market information as used herein means the highest bid price and the lowest ask price. Market depth information as used herein means information associated with all or any part of the current bid and ask quantities as represented in the order book 12. Other market information that maybe sent to the client devices 52, 54 from the host system 10 may include the last traded quantity (LTQ), the last traded price (LTP), the total traded quantity (TTQ), and so on. The host system 10 typically determines which market information, including what portion of the market depth, is sent to the client devices 52, 54.

The fair exchange preferably reduces the inequities discussed in the background section above. For example, one embodiment of the fair exchange may cause data sent from the host system to the client devices to be displayed nearly simultaneously at the client devices. Another embodiment of the fair exchange may cause data sent from the client devices to be prioritized at the host based on when the data was sent from a local communication server to which a group of client devices have roughly equivalent access (as opposed to being based only on when the data is received at the host). More detail on these embodiments and other embodiments are described below.

Data Sent from the Host System to the Client Devices

In a preferred embodiment, market data may be sent to the client devices 52, 54 from the local communication servers 38, 46 simultaneously or nearly simultaneously so that the display on the client devices 52, 54 is nearly simultaneous. The time at which the market information is to be sent to the client devices may be determined by the host system 10, with the actual release being controlled by the local communication servers 38, 46.

Figure 2:
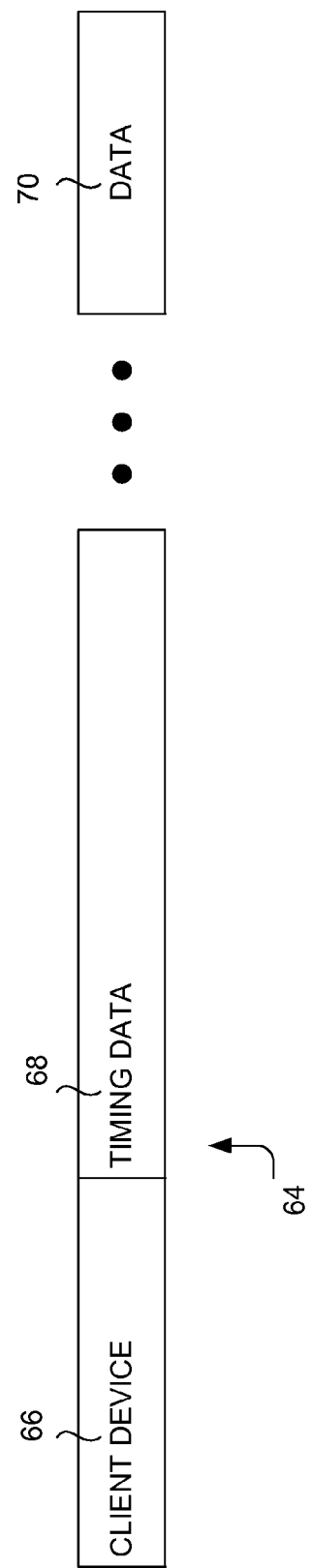
FIG. 2 is one example of a packet with timing data.

In one embodiment, the time that data is to be released from the local communication servers 38, 46 may be included in the packet sent from the host system. Referring to FIG. 2, there is shown one example of a packet 64 with timing data 68. The packet 64 may include client device information 66 that indicates the address or an identification for a client device or group of client devices so that the packet may be routed to the client device(s). Alternatively, the packets being sent from the exchange host may not include any destination information and routing or multicasting techniques known to those of ordinary skill in the art can be employed to ensure that data is forwarded to the appropriate location. The packet 64 further includes data 70 (such as market information) that may be formatted for display at the client device. The timing data 68 preferably relates to the control of the timing of the transmission of the packet 64 through the network. For example, the timing data may comprise a "send time." As discussed below, the "send time" may be a predetermined time later than when the packet 64 is sent from the host device. This "send time" may instruct the local communication servers 38, 46 to send the packet when the actual time equals the "send time." The local communication servers 38, 46 may compare the "send time" to a local time, as provided by the clocks 36, 44, to determine when to release the packet 64.

Figure 3:
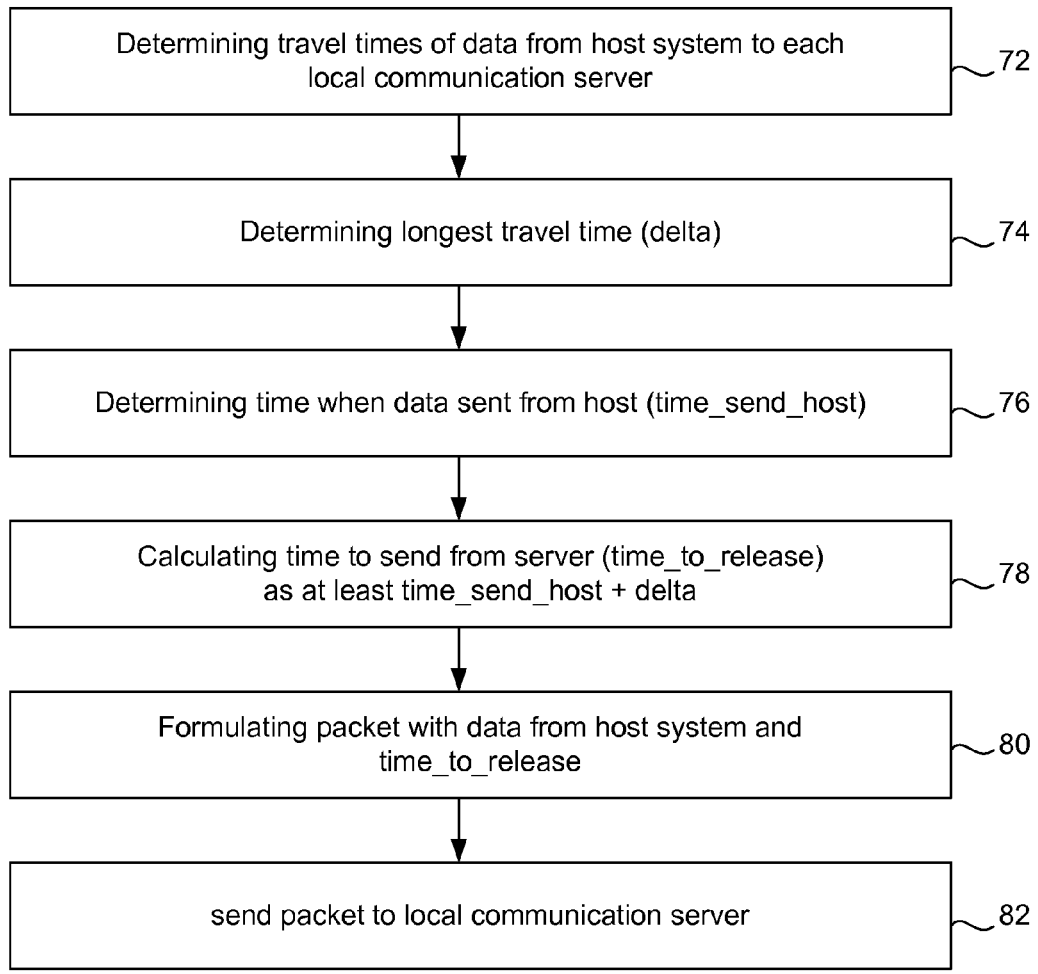
FIG. 3 is a flow chart illustrating an example process for formulating data with timing information and sending the data from a host device to a network device.

Referring to FIG. 3, a flow chart illustrates example steps that a host system of one embodiment would take to send a packet containing timing information to the local communication servers 38, 46. As shown at block 72, the travel times of the data from the host system 10 to each of the local communication servers 38, 46 is determined. There are many ways to determine travel times for the data. Several example techniques are discussed below.

As shown at block 74, the travel times may be examined to determine the longest travel time, referred to as "delta." The time when the packet is sent from the host system 10 is determined (time_send_host), as shown at block 76. Then, the timing data 68 (shown in FIG. 2) is determined. In one embodiment, the timing data 68 instructs the local communication servers 38, 46 to send the market data on to the client devices 52, 54 at a predetermined time, time_to_release. As shown at block 78, the time, time_to_release, may be calculated as a time that is greater than or equal to the time_send_host+delta (as determined at block 74). A packet is formulated with the data from the host and the timing data 68, time_to_release, as shown at block 80. The packet is then sent to the local communication server 38, 46, as shown at block 82. Alternatively, the data can be time stamped at the host and the packet can include the time_send_host. In this alternative embodiment, the time_to_release would be calculated at the local communication servers 38, 46.

Figure 4:
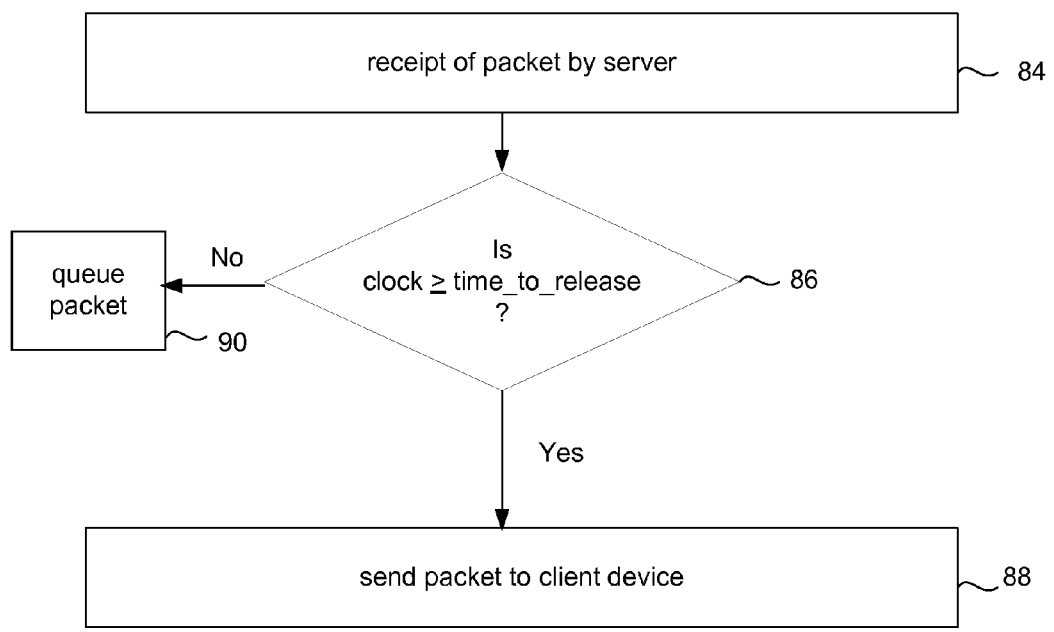
FIG. 4 is a flow chart illustrating an example process for receiving data with timing information and managing the data based on timing information.

Referring to FIG. 4, a flow chart illustrates example steps of a device or program within the local communication server 38, 46 of one embodiment controlling the release of a packet to the client devices 52, 54. A packet with timing data is received by the local communication server, as shown at block 84. The server preferably parses the packet for the timing data (time_to_release). In one embodiment, as shown in FIG. 1, the processors 40, 48 parse the packet to determine the timing data. Further, software may be accessed by the processor 40, 48 from the memory device 42, 50. Any other technique known to those skilled in the art for reading the packet's timing data may alternatively be used. The local communication server 38, 46 may then access the clock 36, 44 to compare the clock time to time_to_release, as shown at block 86. The packet is sent to the client device from the local server when the clock time is greater than or equal to time_to_release, as shown at block 88. If the clock time is not greater than or equal to time_to_release, the packet is placed in a queue as shown at block 90. The packets are preferably ordered in the queue starting with the packet with the earliest time_to_release. As known to those of ordinary skill in the art, different operators (e.g., greater than, less than, less than or equal to, etc.) depending on how time is being measured.

Figure 5:
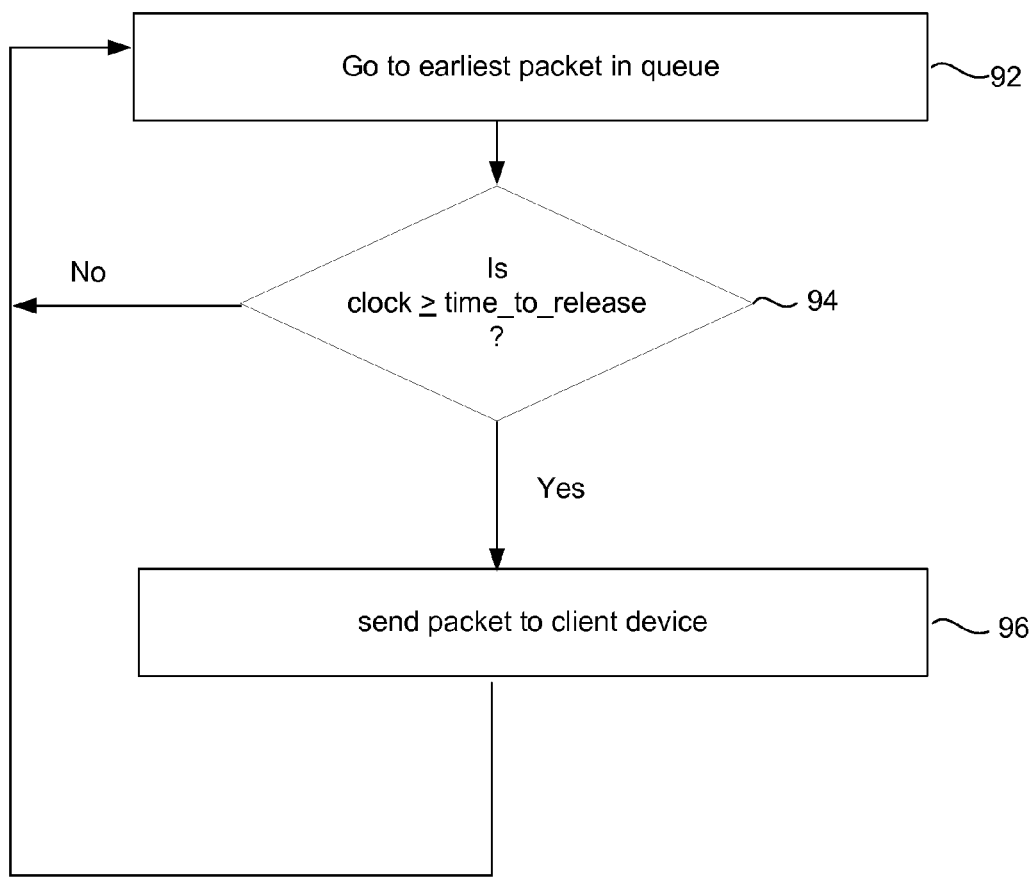
FIG. 5 is a flow chart illustrating an example process for determining when to forward stored data to a client device based on timing information.

Referring to FIG. 5, a flow chart illustrates example steps of a device or program within the local communication server of one embodiment controlling the sending of packets, which have been placed in the queue. The software looks to the first packet in the queue as shown at block 92. Then, the local communication server may access its clock to determine if the current time is greater than or equal to time_to_release as shown at block 94. If it is, then the packet is forwarded to the client device as shown at block 96. If it is not, the algorithm repeats itself, e.g. returns to step 92. The software is preferably programmed to repeatedly check the earliest packet in the queue every time a time interval has elapsed.

The flow charts shown in FIGS. 3, 4 and 5 provide only an example of one embodiment and it should be understood that more or fewer steps may be utilized or the steps may occur in one or more orders which are different from the order of steps shown in FIGS. 3, 4 and 5 without departing from the spirit of the fair exchange invention. For example, rather than comparing the clock to time_to_release before placing a packet in the queue (as shown at block 86 of FIG. 4), the software could alternatively place all received packets immediately into a queue and then follow the flow chart shown in FIG. 5. There are many other alternatives that will be apparent to those skilled in the art upon review of this detailed description.

Using a specific example, if the travel time of data from the host system 10 to local communication server 38 is 0.05 seconds and if the time of travel of data from the host system 10 to local communication server 46 is 0.15 seconds, the host system 10 may determine that, in order to present the data at the client devices 52, 54 simultaneously (or nearly simultaneously), the local communication servers 38, 46 will send the data to the client devices 0.15 seconds after the host 10 sends the data. Specifically, if the data is sent from the host at t=0 seconds, then the time_to_release=0.15 seconds. In this manner, inequities due to differences in data travel time will be reduced because the data packets are held at the local communication servers 38, 46 to account for one of the network paths being slower. To ensure that the data is sent from the client servers nearly simultaneously at the time_to_release, the local communication servers 38, 46 may access clocks (and preferably clocks which are synchronized with one another as discussed above) to compare the clock time with time_to_release and to send the data at time_to_release.

Alternatively, instead of a time_to_release, the local communication servers 38, 46 may be instructed to wait for a predetermined "wait time" before sending the data to the client devices. In the example used above, the host system 10 may instruct the local communication server 38 for client devices 52 to wait for a "wait time" of 0.10 seconds and may instruct the local communication server 46 for client device 54 to wait for a "wait time" of 0 seconds. In this manner, the wait times may reduce the disparity caused by differences in data travel times. Alternatively, the wait times or the time_to_release can be set to accommodate a period of time longer than the longest send time to provide more room for error or computer processing time. For instance, in the example above the local communication servers 38,46 can be programmed to send data to the client devices 0.20 seconds after the host sends the data.

Data Sent from the Client Devices to the Host System

As discussed in the background section, one important issue in electronic exchange networks is the ordering of trading events/data sent from traders. The traders send data, for example a buy or sell order or other transaction, from the client devices, e.g. 52, 54, to the host system 10. For fairness, the data sent should be ranked based, at least in part, on when the data was sent from the client device (or sent from a node close to the client device). Inequities may result if the electronic exchange queues the transaction based only on when the transactions are actually received at the exchange (or host system).

In a preferred embodiment, the fair exchange uses a system of synchronized clocks close to, but not at, the client devices and at the exchange host. In a preferred embodiment, the clocks 36, 44 are placed at local communication servers 38, 46 and the clock 24 is placed at the exchange host system 10. Transactions would then be time stamped close to the originator (client device) at the local communication servers 38, 46. If the location of the local communication servers 38, 46 is picked wisely, using this timestamp as the basis of prioritization at the host system 10 will result in a fairer ordering of transactions at the exchange host system in a practical manner. At the host system 10 or matching engine 11, transactions are queued in the order of their timestamp, instead of the current sequence of arrival that prefers the participant with the lowest latency to the host system or matching system. To allow the slowest participant to have relatively equal chances, in a preferred embodiment all transactions are held in the arrival queue until a transaction from the slowest participant could have arrived. This leads to the problem of determining what the wait time needs to be, since slowing down the transaction processing too much may cause overall performance degradation. Thus, it is important to have the arrival queue delay as low as possible. In particular, the delays in processing transactions sent to the host system 10 should be kept to a minimum.

In a preferred embodiment, the clocks 36, 44 are placed at a network device geographically near the client devices, 52, 54 such as the local communication servers 38, 46. In this manner, when the client devices send data to the host system 10 and the data is routed through the local communication servers 38, 46, the local communication servers 38, 46 time-stamp the data using synchronized clocks 36, 44. The host system 10 may then compare the time-stamps of the data to approximate when the data was sent from the client devices 52, 54.

Figure 6:
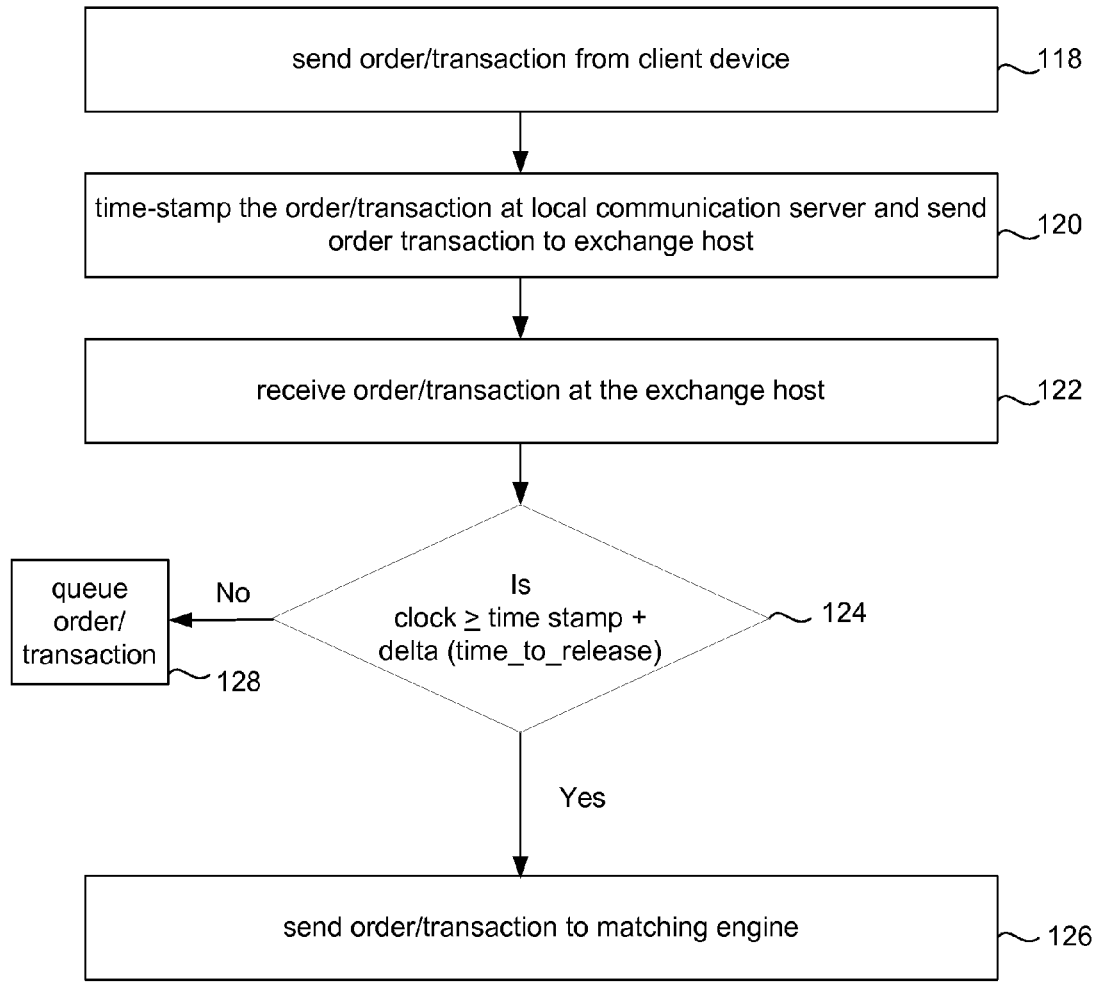
FIG. 6 is a flow chart illustrating an example process for managing data using timing information sent from a client device for ultimate submission to a matching engine.

Referring to FIG. 6, there is shown a flow chart for how data is sent from the client devices 52, 54 to the host system 10 and how that data is prioritized at the host system 10 in a preferred embodiment of the fair exchange. The data is sent from the client devices 52, 54 to the host system 10, as shown at block 118. The data is received at a point in the network (such as, for example, local communication servers 38, 46 in FIG. 1) and the data is time-stamped, as shown at block 120. In the example of FIG. 1, processor 40, 48 may access the clocks 36, 44 to time-stamp the data. The data is then received at the host system 10, as shown at block 122. The data is analyzed to determine if the current time is greater than or equal to the time stamp plus the previously determined longest travel time (referred to as "delta") as shown at block 124. This time can be referred to as time_to_release. Alternatively, the local communication servers 38, 46 can calculate the time_to_release and store that value in the data packet being sent.

The host system 10 preferably accesses the clock 24 to obtain the current time. If the answer is yes, the data (which in this example represents an order or transaction) is forwarded to the central matching engine 11 as shown at block 126. If the answer is no, the data is placed in a queue as shown at block 128. The data is preferably ordered in a queue based on the time-stamps, from earliest to latest time-stamps.

Figure 7:
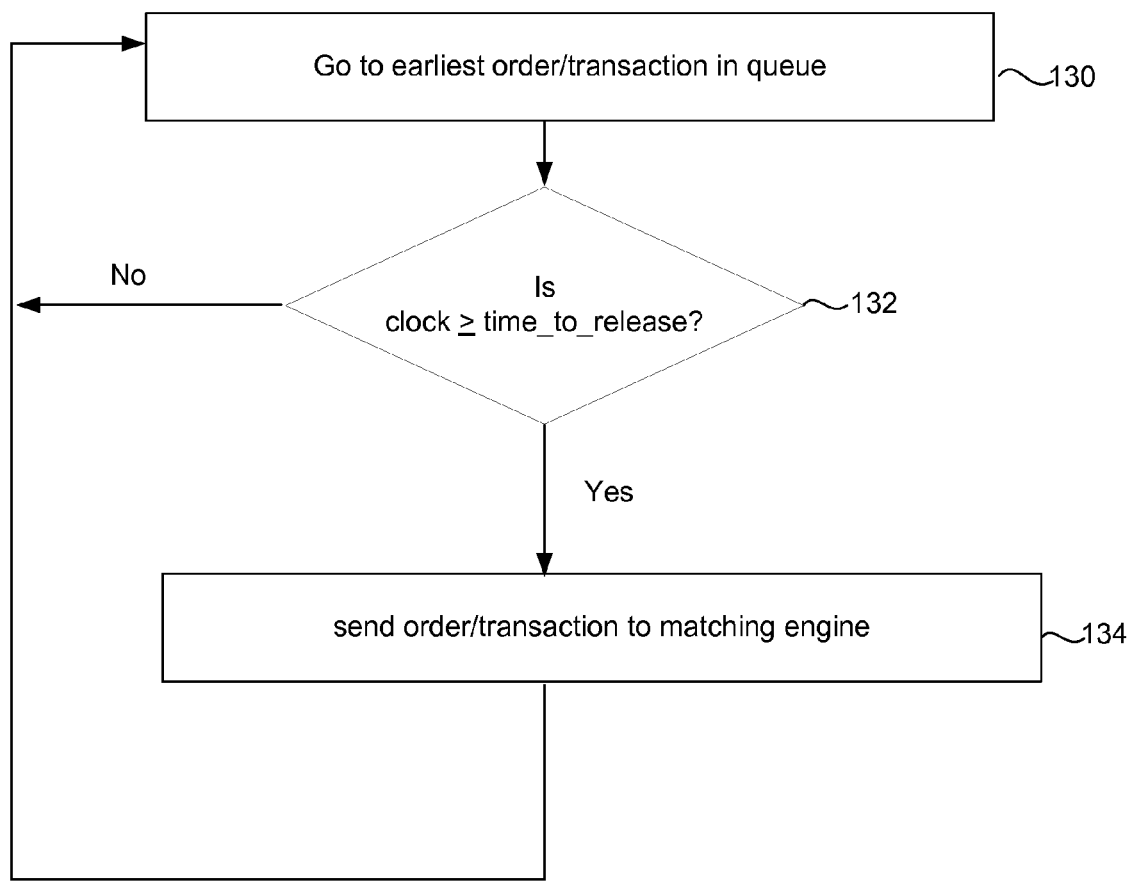
FIG. 7 is a flow chart illustrating an example process for determining when to forward stored data to a matching engine based on timing information.

Referring to FIG. 7, there is shown a flow chart for how the host system 10 may manage the incoming transaction queue, referenced at step 128 in FIG. 6, in a preferred embodiment. The method looks to the first packet in the queue as shown at block 130. Then, the host system 10 may access its clock to determine if the current time is greater than or equal to the time_to_release, as shown at block 132. If it is, the transaction is forwarded to the matching engine as shown at block 134. If it is not, the method returns to step 130. The method is preferably programmed to repeatedly check the earliest packet in the queue every time a preset time interval has elapsed.

The flow charts shown in FIGS. 6 and 7 provide only an example of one embodiment and it should be understood that more or fewer steps may be utilized or the steps may occur in one or more orders which are different from the order of steps shown in FIGS. 6 and 7, without departing from the spirit of the present invention. For example, rather than comparing the clock to the time_to_release before placing a packet in the queue (as shown at block 124 of FIG. 6), the method may alternatively place all data received immediately into a queue and then follow the flow chart shown in FIG. 7. There are many other alternatives that will be apparent to those skilled in the art upon review of this detailed description.

Determining Travel Times

There are various techniques known to those of ordinary skill in the art to determine the travel time between two devices in a network. The present invention is not limited to any particular technique. In one embodiment, travel time is monitored by using packets that contain time stamps from the originating node which are then compared with the clock time on the arrival node to determine the slowest end node. In this embodiment, a packet is sent from the central communication servers 18, 26 to the local communication servers 38, 46 that includes a time stamp provided by the clock 24. The local communication servers 38, 46 can then determine the travel time of that packet by calculating the difference between the time stamp and the time the packet is received at the local communication server 38, 46 by accessing the clocks 36, 44. The local communication servers 38, 46 may communicate the calculated travel time to the host 10. After receiving travel times to the various local communication servers, the host may then determine the slowest travel time by comparing the different travel times. This slowest travel time can then be used as the longest send time (delta) as described above.

In an alternative embodiment, travel times can be measured using a "pinging" approach. This technique involves the central communication servers 18, 26 pinging the local communication servers 38, 46. The central communication servers 18, 26 track the time that a pinging message is sent. When a reply message is received, the central communication server can calculate the round trip time by subtracting the time the message was sent from the time the reply message was received. After pinging the local communication servers, the host can determine the slowest round trip travel time. The longest travel time (delta) may be calculated as the slowest round trip travel time divided by two.

Regardless of which technique is utilized, the system may periodically determine and adjust the longest travel time. These measurement techniques may be performed automatically or triggered manually. In the case of network problems, travel time could be excessively high for one node causing a significant slow down for all market participants. To overcome this issue, an administrative delta may be imposed based, for example, on knowledge of the network, such as on average delays for all participants, or based on a select number of pings.

Other measures may alternatively be used. For example, the longest travel time may be set at any value that levels the playing field to a certain extent, while still encouraging participation in the market.

The components that are used to measure delays or assign timestamps are preferably under control of the host system or some reliable third party. This minimizes the risk of someone skewing the measurements by, for example, modifying packets that are designed to measure travel times. Therefore, the local communication servers 38, 46, which are preferably under the control of the host system, are better suited to measure travel times or assign timestamps than the client devices 52, 54. When it is necessary to measure delays or assign timestamps on a device that is not under control of the exchange or a reliable entity, one should carefully monitor the system when using the any method to determine the local line delay.

Because the largest differences in data travel times occur between the central communication servers 18, 26 and the local communication servers 38, 46 (due, e.g., to transcontinental lines, frame relay, etc.) the largest benefit in reducing time differences comes from synchronizing the local communication servers 38, 46 with the central communication servers 18, 26. Therefore, from a practical standpoint, using the local communication servers 38, 46 to measure delays and assign timestamps reduces the largest inequities in the system.

Additional Alternative Embodiments

In an alternative embodiment, synchronized clocks may be placed in or connected to devices in the network path further away (for example, geographically or based on network path) from the client devices. For example, rather than positioning the clocks at local communication servers 38, 46, devices such as access servers, routers, gateways or the like within the networks 32, 34 may be modified to include or work with synchronized clocks. Similar to the local communication servers 38, 46, that device may delay transmission of the data to the client devices until a predetermined time or may delay the release for a predetermined time. Likewise, these network devices may time-stamp the data sent from the client devices 52, 54 to the host system 10.

In another alternative embodiment, to achieve simultaneous or nearly simultaneous display of data at the client devices, the operation of the host system 10 may be modified to send data to the client devices 52, 54 via local communication servers 38, 46 at different times. In determining how to modify the operation of the host system 10, at least a portion of the travel times of data from the host system 10 to each of the client devices 52, 54 may be determined. For example, the round trip travel time (from host system 10 to local communication servers 38, 46 back to host system 10) may be determined. Alternatively, the travel time from the host system 10 to the local communication servers 38, 46 may be determined. As discussed above, there are a multitude of methods of determining time of travel of data.

Based on the travel times, the host system 10 may send data to each of the client devices 52, 54 via the local communication servers 38, 46 at different times. In this manner, the sending of data from the host system 10 to the client devices 52, 54 is staggered based on the travel times of data in the parts of the network in which a disparity of travel time is most likely and based on measurements that are more reliable because the components being measured can be more reliably controlled. Based on this staggered sending, the data should be received by the client devices 52, 54 at, or nearly at, the same time. Referring to FIG. 1, at least one component in the host system host 10 may be modified. For example, either the exchange host central order book 12 or the central communications servers 18, 26 may be modified to stagger the sending of the data. Specifically, the processor 14 in the central order book 12 may access memory 16 to access software to stagger the sending of data. Alternatively, the processor 20, 28 in central communication servers 18, 26 may access memory 22, 30 to access software to stagger the sending of data.

Figure 8:
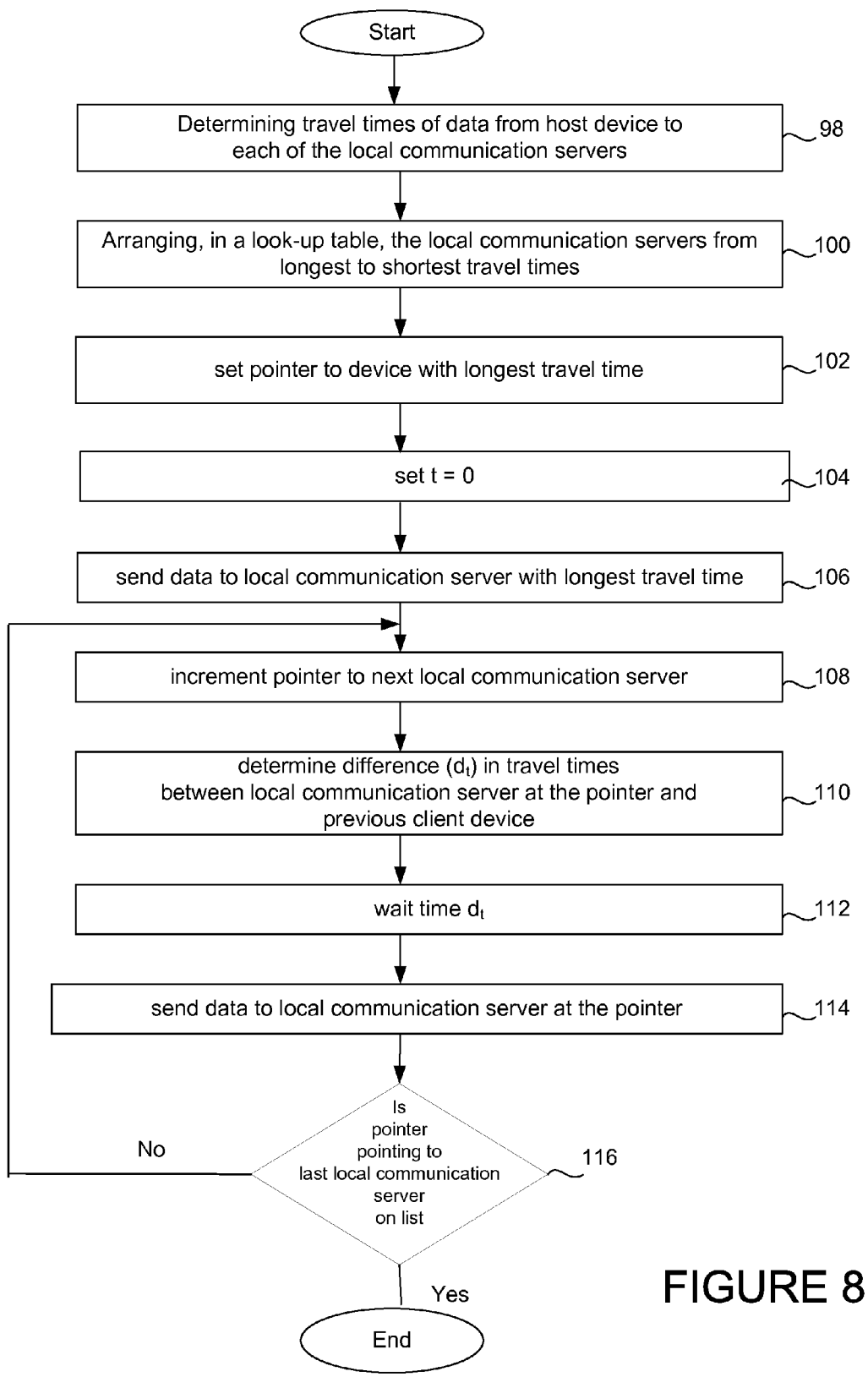
FIG. 8 is a flow chart illustrating an alternative example process for determining when to forward data to a plurality of client devices based on timing information.

Referring to FIG. 8, there is shown a flow chart of a host system sending data to client devices at different times. The flow chart may be implemented by processor 14 using software in memory 16 (as shown in FIG. 1). At block 98, the travel times of data from the host system to each of the local communication servers is determined. The local communication servers may then be arranged in a look-up table in the order of longest to shortest travel times, as shown at block 100. The look-up table may be contained in memory device 16 (FIG. 1). A pointer is set to the local communication server with the longest travel time, as shown at block 102. The time is set to zero, as shown at block 104. Data is then sent to the local communication server with the longest travel time, as shown at block 106. The flow chart then enters a loop, with the pointer being incremented to the next local communication server in the look-up table, as shown at block 108. The difference ($d_t$) in travel times is then determined between the local communication server at the pointer and the previous local communication server, as shown at block 110. The system then waits the different ($d_t$), as shown at block 112. Next, the data is then sent to the local communication server at the pointer, as shown at block 114. The loop is executed until the pointer is pointing to the last local communication server in the look-up table, as shown at block 116.

In the specific example used above (with the difference in travel time equal to 0.1 seconds), the host system 10 may stagger the sending of data (sending data first to client devices 54 via local communication server 46, wait a predetermined time then send the data to client devices 52 via local communication sever 38). In the current example, the host system 10 may first send data to local communication server 46 (and, thereby, client devices 54), wait 0.1 seconds (based on the difference in travel times), and then send the data to local communication server 38 (and, thereby, client devices 52). In this manner, client devices 52 and client devices 54 should receive the data at approximately the same time. The exchange host system preferably includes or has access to a clock 24 so that the host system 10 may wait the predetermined necessary time.

In another alternative embodiment, the operation of the host system 10 may be modified to prioritize transactions based on the time the data is received by the host 10 and based on the various travel times from the local communication servers 38, 46. In one aspect, the travel times of data from each of local communication servers 38, 46 to the host system 10 may be determined. In this manner, when data is received at the host system 10, it may be time-stamped. The host system 10 may then determine when the data was sent from the local communication servers 38, 46 based on the time-stamp and the travel times.

Specifically, this alternative is based on an arrival queue with time-based ordering. The major difference is that this system may impose delays in a penalty scheme based on measured average travel times. If a connection were very fast, the imposed delay would be higher than for a slower connection.

Figure 9:
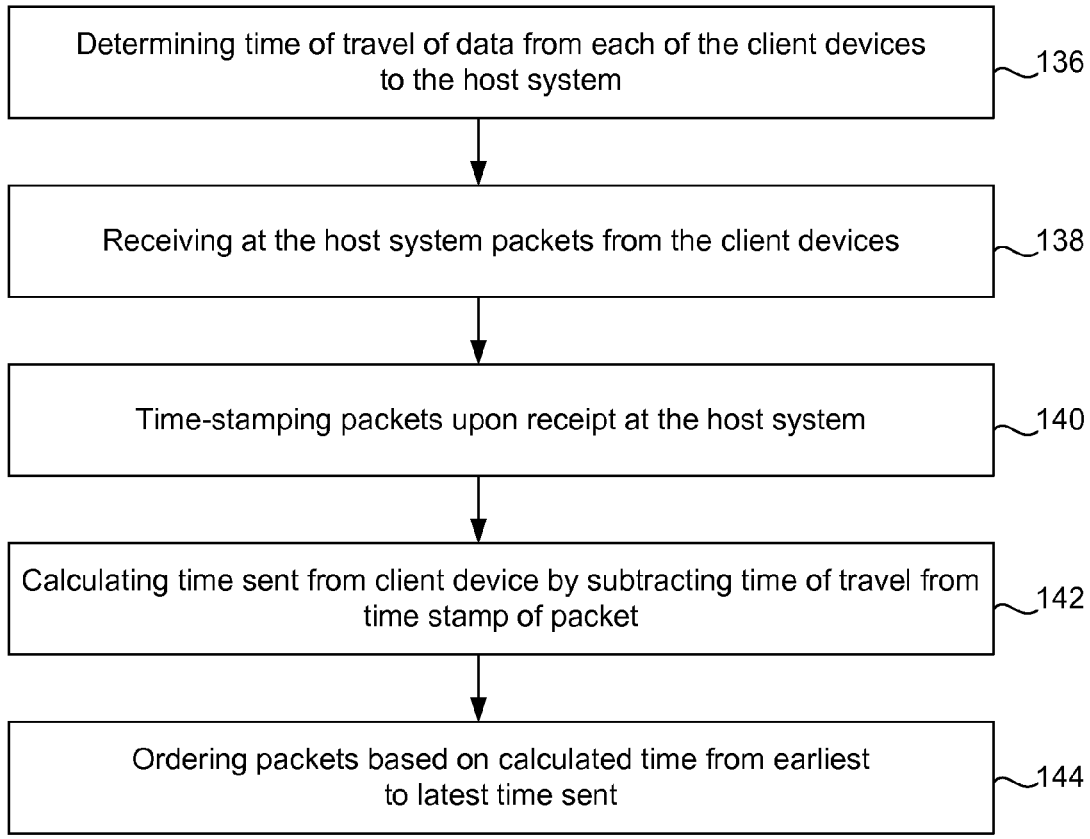
FIG. 9 is a flow chart illustrating an alternative example process for ordering data at a host device using timing information.

Referring to FIG. 9, there is shown a flow chart of the operation of the host system 10 in this alternative embodiment in which data is ordered based on the time the local communication servers 38, 46 send the data. The time of travel of data from each of the local communication servers 38, 46 to the host system 10 is determined, as shown at block 136. The time of travel may be determined by processor 14, as shown in FIG. 1, and stored in a look-up table in memory device 16. The host system 10 then receives the data from the client devices via the local communication servers 38, 46, as shown at block 138. The data is time-stamped upon receipt by the host system 10, as shown at block 140. The packets may be time-stamped by assessing the clock 24, as shown in FIG. 1. The host system 10 may then calculate the approximate time when the packets were sent from the local communication servers 38, 46 by subtracting the time of travel (determined at block 136) from the time-stamp of the data t, as shown at block 142. The data is then ordered based on the calculated time, from the earliest to the latest, as shown at block 144. For example, processor 14, in FIG. 1, may determine the calculated time by accessing the time of travel in the look-up table in memory device 16 and order the data based on the calculated time. In this manner, the data is not ordered immediately upon receipt at the host system 10. Rather, the data may be held temporarily for a predetermined time period (delay).

The delay may be determined in a variety of ways. The delay may be the longest travel time of data from a local communication server to the host system. Alternatively, the delay may depend on which local communication server the data is sent from. For example, the delay for data from a specific local communication server may be based on the difference between the longest travel time of data from any local communication server to the host system and the travel time of the data from the specific local communication server to the host system as follows:

tmax: maximum network delay (round trip travel time)
tn: network delay for participant n (round trip)

$$delay = tmax/2 - tn/2$$

This delay calculation could alternatively be based on a measured one way travel times as discussed above. In any event, the travel times are preferably averaged over a number of samples. In still another alternate embodiment, the delay may be preselected.

Using a specific example, if the time of travel from local communication server 38 and local communication server 46 to the host device is 0.05 and 0.15, respectively, and the time stamped data from local communication server 38 and local communication server 46 is 0.3 and 0.35, respectively, the host system 10 may determine which data was sent first. In this example, calculating the time when the data was sent from each local communication server is as follows:

$$\text{time-stamp} - \text{time of travel} = \text{time data sent from local communication server}$$

In the present example, for first local communication server 38, the time the data was sent is 0.25 (0.3−0.05). For local communication server 46, the time the data was sent is 0.2 (0.35−0.15). Therefore, the host device may determine that the data was actually sent first from second local communication server 46 rather than first local communication server 38, even though the data from first local communication server 38 was received at the host first. Thus, the data from the first local communication server 38 is not processed at the time it was received at the host system 10 device (in the example, 0.3); rather, the data may be held for a predetermined period until it processed. For example, the data may be held for 0.15 seconds, based on the longest travel time of data from any local communication server to the host device. Alternatively, the data may be held for 0.1 seconds, based on the difference of the longest travel time (0.15 seconds) and the travel time for the data (0.05 seconds).

In using the apparatuses and methods described above, trading in an electronic exchange may be fairer for those who participate. Data sent from a host system to client devices may be displayed simultaneously or nearly simultaneously. Likewise, the electronic exchange may order data sent from client devices based, at least in part, on when the client device sent the data or an approximation thereof. Thus, electronic exchange trading may be more equitable.

Preferred embodiments of the present invention have been described herein. It is to be understood, of course, that changes and modifications may be made in the embodiments without departing from the true scope of the present invention, as defined by the appended claims. The present embodiment preferably includes logic to implement the described methods in software modules as a set of computer executable software instructions. A processor implements the logic that controls the operation of the at least one of the devices in the system, including the host system 10, one, some or all of the devices in the network, and/or the client devices. The processor executes software that can be programmed by those of skill in the art to provide the described functionality.

The software can be represented as a sequence of binary bits maintained on a computer readable medium described above, for example, as memory devices 16, 22, 30, 42, 50 in FIG. 1. The computer readable medium may include magnetic disks, optical disks, and any other volatile or (e.g., Random Access memory ("RAM")) non-volatile firmware (e.g., Read Only Memory ("ROM")) storage system readable by the processor. The memory locations where data bits are maintained also include physical locations that have particular electrical, magnetic, optical, or organic properties corresponding to the stored data bits. The software instructions are executed as data bits by the processor with a memory system causing a transformation of the electrical signal representation, and the maintenance of data bits at memory locations in the memory system to thereby reconfigure or otherwise alter the unit's operation. The executable software code may implement, for example, the methods as described above.

It should be understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the teachings described herein.

It should further be understood that a hardware embodiment might take a variety of different forms. The hardware may be implemented as an integrated circuit with custom gate arrays or an application specific integrated circuit ("ASIC"). The embodiment may also be implemented with discrete hardware components and circuitry. In particular, it is understood that the logic structures and method steps described in the flow diagrams may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A method including:
    receiving by a host exchange a first transaction message at a first receipt time, wherein the first transaction message is received by a first network device from a first client device before being received by the host exchange;
    receiving by the host exchange a second transaction message at a second receipt time, wherein the second transaction message is received by a second network device from a second client device before being received by the host exchange;
    determining by the host exchange a first time based on a first travel time and the first receipt time, wherein the first travel time is a time from the first network device to the host exchange, wherein the first time is an approximation of the time at which the first network device sent the first transaction message;
    determining by the host exchange a second time based on a second travel time and the second receipt time, wherein the second travel time is a time from the second network device to the host exchange, wherein the second time is an approximation of the time at which the second network device sent the second transaction message; and
    prioritizing by the host exchange the first transaction message and the second transaction message based on the first time and the second time.

2. The method of claim 1, wherein the first transaction message includes an order.

3. The method of claim 1, wherein the first network device is geographically positioned at approximately the same location as the first client device and wherein the second network device is geographically positioned at approximately the same location as the second device.

4. The method of claim 1, wherein the first network device and the second network device are under control of the host exchange.

5. The method of claim 1, wherein the first travel time and the second travel time are determined by the host exchange.

6. The method of claim 1, wherein the first travel time and the second travel time are stored in a look-up table.

7. The method of claim 1, wherein the first time is determined by subtracting the first travel time from the first receipt time.

8. The method of claim 1, wherein the second time is determined by subtracting the second travel time from the second receipt time.

9. The method of claim 1, wherein the first and second transaction messages are prioritized by ordering the first and second transaction messages for processing from earliest to latest.

10. The method of claim 1, wherein the first time is determined before the second transaction message is received by the host exchange.

11. The method of claim 1, wherein the prioritizing of the first transaction message and the second transaction message is not completed until after a delay period has elapsed.

12. The method of claim 11, wherein the delay period is based on at least one of the first travel time and the second travel time.

13. The method of claim 11, wherein the delay period is preselected.

14. A system including:
    a host exchange,
    wherein the host exchange is adapted to receive a first transaction message at a first receipt time, wherein the first transaction message is received by a first network device from a first client device before being received by the host exchange,
    wherein the host exchange is adapted to receive a second transaction message at a second receipt time, wherein the second transaction message is received by a second network device from a second client device before being received by the host exchange,
    wherein the host exchange is adapted to determine a first time based on a first travel time and the first receipt time, wherein the first travel time is a time from the first network device to the host exchange, wherein the first time is an approximation of the time at which the first network device sent the first transaction message,
    wherein the host exchange is adapted to determine a second time based on a second travel time and the second receipt time, wherein the second travel time is a time from the second network device to the host exchange, wherein the second time is an approximation of the time at which the second network device sent the second transaction message, and
    wherein the host exchange is adapted to prioritize the first transaction message and the second transaction message based on the first time and the second time.

15. The system of claim 14, wherein the first transaction message includes an order.

16. The system of claim 14, wherein the first network device is geographically positioned at approximately the same location as the first client device and wherein the second network device is geographically positioned at approximately the same location as the second device.

17. The system of claim 14, wherein the first network device and the second network device are under control of the host exchange.

18. The system of claim 14, wherein the first travel time and the second travel time are determined by the host exchange.

19. The system of claim 14, wherein the first travel time and the second travel time are stored in a look-up table.

20. The system of claim 14, wherein the first time is determined by subtracting the first travel time from the first receipt time.

21. The system of claim 14, wherein the second time is determined by subtracting the second travel time from the second receipt time.

22. The system of claim 14, wherein the first and second transaction messages are prioritized by ordering the first and second transaction messages for processing from earliest to latest.

23. The system of claim 14, wherein the first time is determined before the second transaction message is received by the host exchange.

24. The system of claim 14, wherein the prioritizing of the first transaction message and the second transaction message is not completed until after a delay period has elapsed.

25. The system of claim 24, wherein the delay period is based on at least one of the first travel time and the second travel time.

26. The system of claim 24, wherein the delay period is preselected.

27. A computer readable medium having stored therein instructions executable by a processor to perform a method including:
receiving by a host exchange a first transaction message at a first receipt time, wherein the first transaction message is received by a first network device from a first client device before being received by the host exchange;
receiving by the host exchange a second transaction message at a second receipt time, wherein the second transaction message is received by a second network device from a second client device before being received by the host exchange;
determining by the host exchange a first time based on a first travel time and the first receipt time, wherein the first travel time is a time from the first network device to the host exchange, wherein the first time is an approximation of the time at which the first network device sent the first transaction message;
determining by the host exchange a second time based on a second travel time and the second receipt time, wherein the second travel time is a time from the second network device to the host exchange, wherein the second time is an approximation of the time at which the second network device sent the second transaction message; and
prioritizing by the host exchange the first transaction message and the second transaction message based on the first time and the second time.

28. The computer readable medium of claim 27, wherein the first transaction message includes an order.

29. The computer readable medium of claim 27, wherein the first network device is geographically positioned at approximately the same location as the first client device and wherein the second network device is geographically positioned at approximately the same location as the second device.

30. The computer readable medium of claim 27, wherein the first network device and the second network device are under control of the host exchange.

31. The computer readable medium of claim 27, wherein the first travel time and the second travel time are determined by the host exchange.

32. The computer readable medium of claim 27, wherein the first travel time and the second travel time are stored in a look-up table.

33. The computer readable medium of claim 27, wherein the first time is determined by subtracting the first travel time from the first receipt time.

34. The computer readable medium of claim 27, wherein the second time is determined by subtracting the second travel time from the second receipt time.

35. The computer readable medium of claim 27, wherein the first and second transaction messages are prioritized by ordering the first and second transaction messages for processing from earliest to latest.

36. The computer readable medium of claim 27, wherein the first time is determined before the second transaction message is received by the host exchange.

37. The computer readable medium of claim 27, wherein the prioritizing of the first transaction message and the second transaction message is not completed until after a delay period has elapsed.

38. The computer readable medium of claim 37, wherein the delay period is based on at least one of the first travel time and the second travel time.

39. The computer readable medium of claim 37, wherein the delay period is preselected.

* * * * *